Sept. 16, 1947.     D. WEISSMAN     2,427,482
ATTACHMENT FOR BABY CARRIAGES AND THE LIKE
Filed Dec. 14, 1945     2 Sheets-Sheet 1
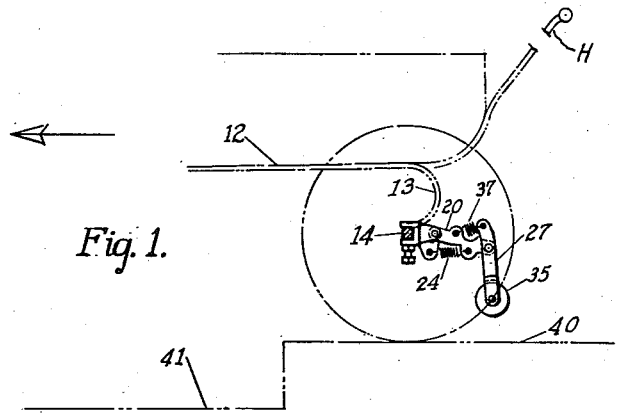
Fig. 1.
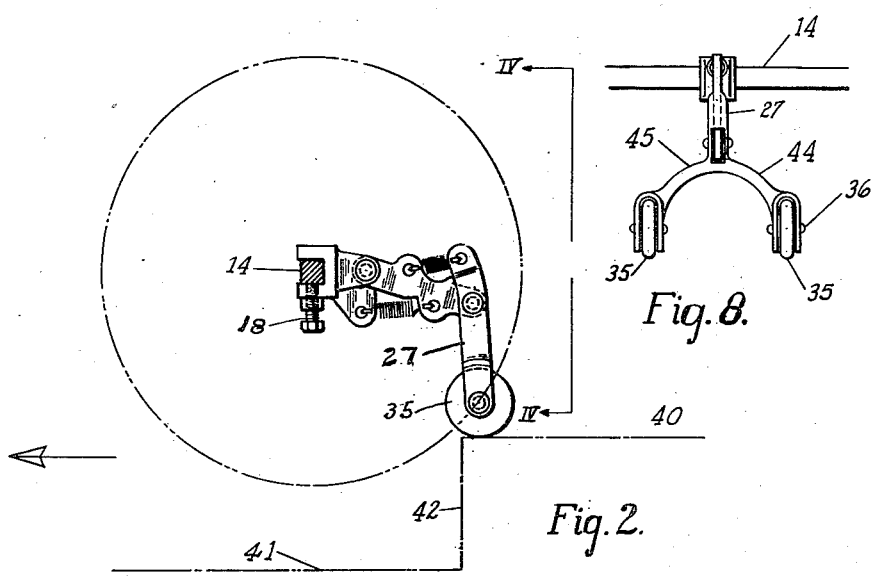
Fig. 8.
Fig. 2.
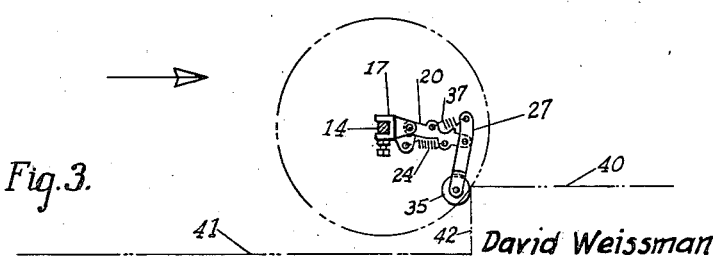
Fig. 3.
David Weissman
INVENTOR
BY
Louis Necho
ATTORNEY

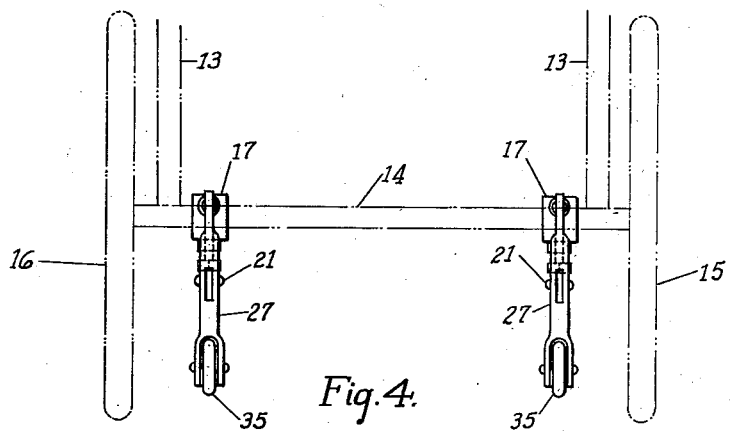
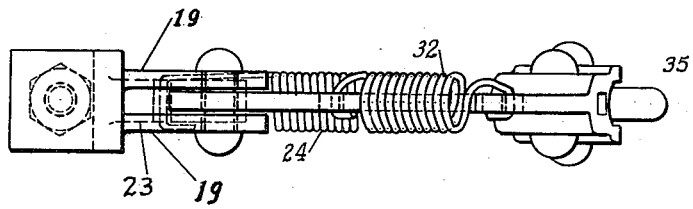
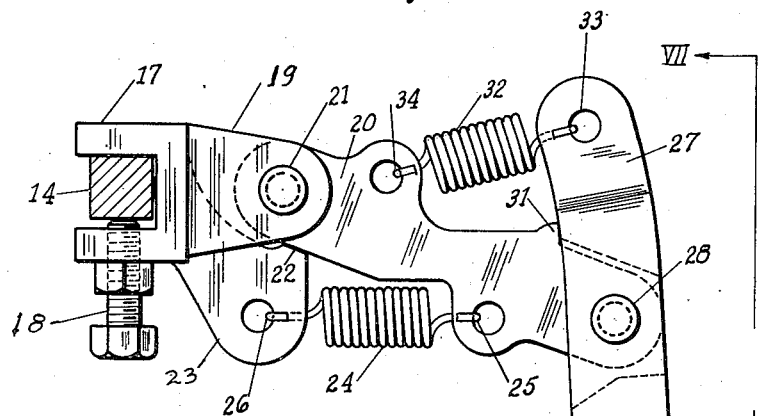
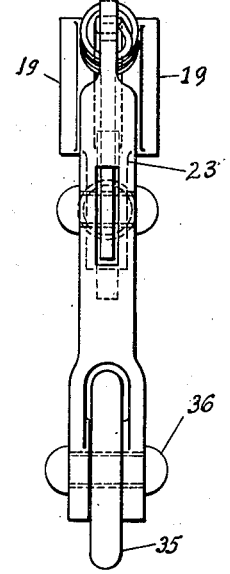
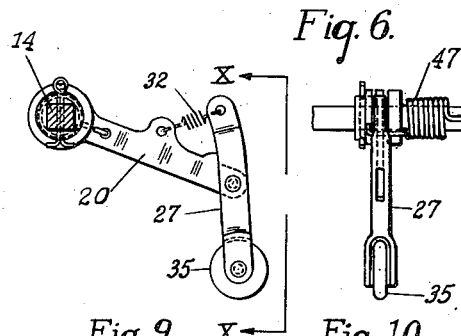
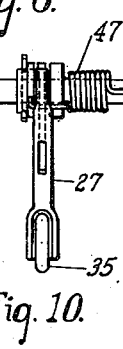

Patented Sept. 16, 1947

2,427,482

UNITED STATES PATENT OFFICE 2,427,482

ATTACHMENT FOR BABY CARRIAGES AND THE LIKE

David Weissman, Philadelphia, Pa.

Application December 14, 1945, Serial No. 634,975

5 Claims. (Cl. 280—29)

1

My invention relates to a baby carriage which is capable of being moved from one level to another without shock or abrupt impact.

One object of the invention is to produce an improved baby carriage.

A further object is to produce an improved attachment which can be incorporated in newly manufactured carriages, or which can be readily applied to carriages already in use.

A still further object is to produce an improved attachment which, when applied to the carriage, will not materially increase the cost or weight of the carriage.

These and other objects are attained by my invention as set forth in the following specification and the accompanying drawings in which:

Fig. 1 is a fragmentary, diagrammatic view, partly in section and partly in elevation, illustrating the application of my invention to the rear wheels of a baby carriage, with the carriage shown moving on an elevated surface such as a sidewalk.

Fig. 2 is an enlarged view, similar to Fig. 1, showing the rear wheels of the carriage after the same have moved off the sidewalk and are descending to the lower surface of a street.

Fig. 3 is a view similar to Fig. 2, showing the rear wheels of the carriage as they move off the lower street level onto the higher level of the sidewalk.

Fig. 4 is a diagrammatic, elevational view looking in the direction of the line 4—4 on Fig. 2.

Fig. 5 is an enlarged top plan view of an attachment embodying my invention.

Fig. 6 is an enlarged side elevational view of the attachment shown in Fig. 5.

Fig. 7 is a rear elevational view looking in the direction of line 7—7 on Fig. 6.

Fig. 8 is a view similar to Fig. 4, showing a modified embodiment of my invention.

Fig. 9 is a reduced view similar to Fig. 6, showing another embodiment of my invention.

Fig. 10 is a fragmentary rear elevational view looking in the direction of the line 10—10 on Fig. 9.

Referring to Figs. 1 and 2, there is shown a wheeled vehicle, such as a baby carriage 12, carried by springs 13 fixed to an axle 14 which carries the rear wheels 15 and 16. As shown in Figs. 1 to 4, I provide two attachments embodying my invention, one near each of the rear wheels.

As will be seen from Figs. 5, 6 and 7, each of the attachments includes a bracket or clamp 17 adapted to be suitably secured to the axle 14, as for example, by a set screw 18. This method of securing the attachment to the axle is used when the attachment is to be applied to carriages now in use. Also, while I prefer to use two attachments, one near each wheel so as to provide improved balance, one attachment positioned near the center of the axle may be used.

2

The bracket 17 includes lugs or ears 19 to which an arm 20 is pivoted, as at 21. The arm 20 is rotatable in either direction about the pivot 21, except that its rotation in clockwise direction, as viewed in Fig. 6, is limited by a stop 22 which is in the nature of a flat edge against which the arm 20 abuts when it is in its lowermost position. The arm 20 is urged in clockwise direction, to the position shown in Fig. 6, by a spring 24, one end of which is secured to the arm 20, at 25, and the other end of which is secured, at 26, to a lug 23 carried by the bracket 17. The attachment also includes an arm 27 pivoted at 28 to the free end of the arm 20 so as to be rotatable in either direction about the horizontal axis of the pivot. The rotation of the arm 27 in counterclockwise direction is limited by abutment of the upper portion thereof against a stop 31 formed on the adjacent portion of the arm 20 and towards which the arm 27 is urged by a spring 32. The spring 32 is secured at 33 to the upper end of the arm 27, and at 34 to the arm 20. The lower end of the arm 27 carries a roller 35 which is suitably journalled for free rotation. As shown, the lower end of the arm 20 is forked or formed into a bail, between the arms of which the roller is disposed and to which it is journalled by means of a pin or stub shaft 36. It will be noted that the arm 20 normally occupies a generally horizontal position, so that its free end is disposed near the periphery of the wheel, and that the arm 27 is normally disposed in a generally vertical position with the roller 35 projecting slightly beyond the periphery of the wheel and slightly above a flat or level surface on which the wheel may be positioned, such, for example, as a sidewalk 40 or a street 41. The distance between the bottom of the roller and the surface on which the wheel rests is determined by the diameter of the wheel but is always such that, as the rear wheel, upon moving from the sidewalk 40 to the street 41, loses contact with the sidewalk, the roller comes into engagement with the sidewalk, as shown in Fig. 2.

In operation, the carriage is pushed or pulled by the usual handle H, and, as long as the carriage moves over a given surface, the parts will be in the position shown in Fig. 1. When, however, it is desired to cross the street, the front wheels, not shown, are dropped onto the street 41. This can be readily and smoothly done because the main weight of the carriage is still on the sidewalk. As the carriage moves in the direction of the arrows in Figs. 1 and 2, the rear wheels approach the curb and begin to drop off the sidewalk. Without the use of my invention, and unless care is exercised and considerable effort is exerted, the rear wheels will drop onto the street with considerable shock or impact. By my invention, as the rear wheels leave the curb, the rollers 35 ride on the sidewalk and, as the carriage wheels move further downwardly to the street level, the arms 20 and 27 are rotated in counterclockwise direction, as viewed in Fig. 2, against the tension of the spring 24. The strength of the spring 24 is preferably substantially equal to the downward force exerted on the axle 14. Since the downward movement of the wheels is resisted by the spring 24, the wheels will approach the lower level slowly and will come to rest on the street 41 gently, without any attention on the part of the person pushing the carriage. As soon as the rollers 35 are out of engagement with the sidewalk, the energy stored in the spring 24 rotates the arms 20 and 27, as a unit, in clockwise direction to the position shown in Fig. 1.

When the carriage is to be moved from the street 41 to the sidewalk 40, the carriage, if desired, is turned around, or pulled backward, so that the rear wheels approach the curb ahead of the front wheels, as shown by the arrows in Fig. 3. As the carriage approaches the sidewalk, the rollers 35 engage the vertical wall 42 of the curb and the arms 27 move in clockwise direction, as viewed in Fig. 3, against the tension of the spring 32. This prevents sudden or abrupt impact of the rear wheels against the curb. The carriage may now be pulled up over the curb and onto the sidewalk in the usual manner.

In Fig. 8, I show a modified embodiment which is essentially the same as that shown in Figs. 1 to 7, except that the lower end of the arm 27 is forked to provide two spaced arms 44 and 45, each of which carries a roller 35. This construction provides the desired balance, and since only one bracket 17, one arm 20, one arm 27, one spring 24, and one spring 32 are used, the attachment shown in Fig. 8 may be lighter and less expensive than that shown in Figs. 1 to 7.

In Figs. 9 and 10, another embodiment is illustrated, in which a spring 47 is substituted for the spring 24. The spring 47 has one end thereof secured to the bracket 17 and the other end thereof secured to the axle so that, when the arm 20 is rotated in counterclockwise direction, as viewed in Fig. 9, energy is stored in the spring 47. Except in this respect, the structure shown in Fig. 10 is identical with that shown in Figs. 1 to 7. Also, the modification of Fig. 8 may be constructed with the spring 47 replacing the spring 24.

What I claim is:

1. An attachment for use on a wheeled vehicle including an axle and a wheel rotatably mounted on said axle and by means of which said vehicle is moved over a supporting surface, said attachment including an arm mounted at one end thereof for rotation about an axis parallel to the axis of said axle, the free end of said arm being disposed near the trailing periphery of said wheel, means for limiting the rotation of said arm in one direction to provide a fixed position for said arm, a roller carried by the free end of said arm, said arm and said roller being so arranged that, when said arm is in said fixed position, said roller is out of engagement with said supporting surface and at least a portion of said roller projects beyond the trailing periphery of said wheel in all positions of said arm, and biasing means urging said arm toward said fixed position with a force substantially equal to the load to which said axle is subjected when said vehicle is in use so that, as said wheel moves from said supporting surface to an abruptly lower supporting surface, said roller engages said first-mentioned supporting surface and carries said load while said arm is rotated in a direction away from said fixed position against the action of said biasing means until said wheel reaches and engages said abruptly lower surface, the energy stored in said biasing means serving to return said arm to said fixed position upon disengagement of said roller from said first-mentioned supporting surface.

2. The structure recited in claim 1 including a bracket adapted to be detachably secured to said axle and means pivotally connecting said arm to said bracket.

3. An attachment for use on a wheeled vehicle including an axle and a wheel rotatably mounted on said axle and by means of which said vehicle is moved over a supporting surface, said attachment including a first arm mounted at one end thereof for rotation about the axis of said axle, the free end of said arm being disposed near the trailing periphery of said wheel, means for limiting the rotation of said arm in one direction to provide a fixed position for said arm, a second arm, means pivotally connecting one end of said second arm to the free end of said first arm, means limiting the rotation of said second arm in one direction about its said pivotal connection to provide a fixed position in which said arms are locked together for joint rotation about said axis, said second arm being rotatable about its said pivotal connection away from and towards its fixed position independently of said first arm, a first biasing means urging said second arm to its said fixed position, a roller carried by the free end of said second arm and so arranged that, when said arms are in their respective fixed positions, said roller is out of engagement with said supporting surface, and at least a portion of said roller projects beyond the trailing periphery of said wheel in all positions of said first arm, and a second biasing means urging said first arm towards its said fixed position with a force substantially equal to the downward force to which said axle is subjected when said vehicle is in use whereby, as said wheel moves from said supporting surface to an abruptly lower supporting surface, said roller engages said first-mentioned supporting surface and said arms are jointly rotated in a direction away from the fixed position of said first arm against the action of said second biasing means until said wheel reaches and engages said abruptly lower surface, the energy stored in said second biasing means serving to return said first arm to its fixed position upon disengagement of said roller from said first-mentioned supporting surface.

4. The structure recited in claim 3 in which a pair of horizontally-spaced rollers are carried by the free end of said second arm.

5. The structure recited in claim 3 in which said first arm is normally disposed substantially horizontally and said second arm is normally disposed substantially vertically.

DAVID WEISSMAN.

REFERENCES CITED

The following references are of record in the file of this patent:

UNITED STATES PATENTS

| Number | Name | Date |
|---|---|---|
| 857,696 | Weinstein | June 25, 1907 |
| 998,771 | Herman et al. | July 25, 1911 |
| 1,191,394 | Brown et al. | July 18, 1916 |